April 24, 1962  C. D. DOSKER  3,030,669
MODULAR INSULATION PANEL AND USE
Filed July 2, 1958  2 Sheets-Sheet 1

INVENTOR.
Cornelius D. Dosker
BY
Ooms, McDougall, Williams & Hersh
Attorneys

April 24, 1962 C. D. DOSKER 3,030,669
MODULAR INSULATION PANEL AND USE
Filed July 2, 1958 2 Sheets-Sheet 2
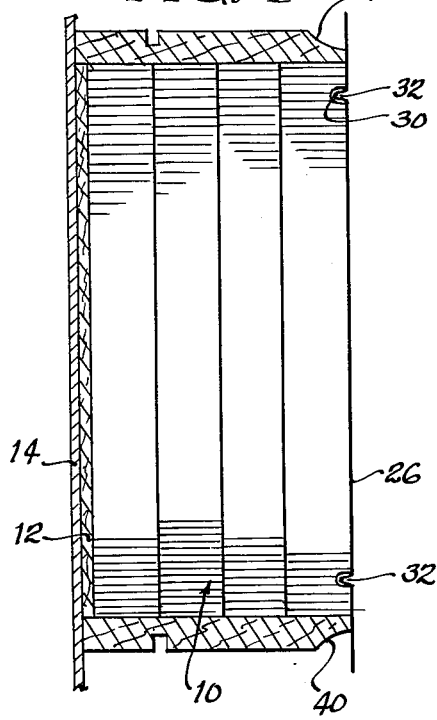
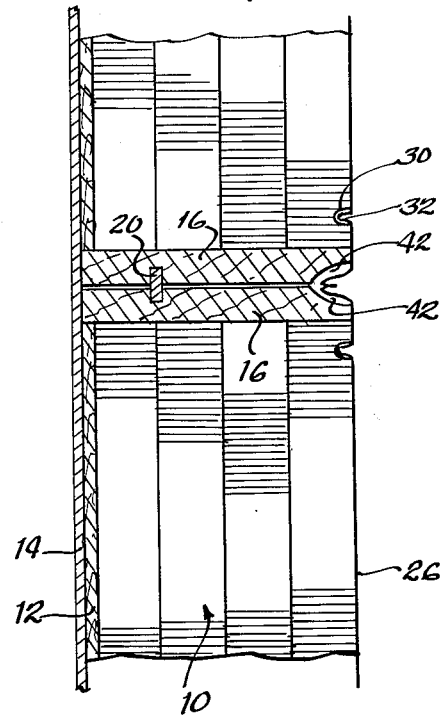
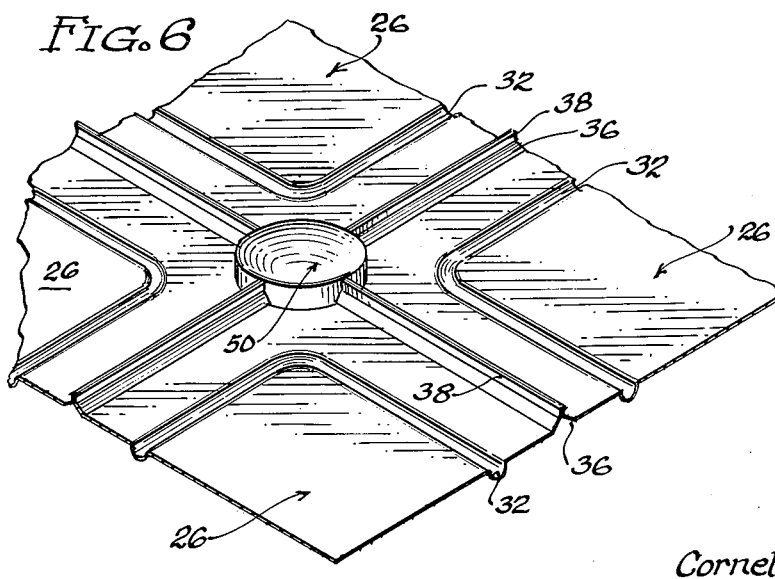
INVENTOR.
Cornelius D. Dosker
BY
Ooms, McDougall, Williams & Hersh
Attorneys

United States Patent Office 3,030,669
Patented Apr. 24, 1962

3,030,669
MODULAR INSULATION PANEL AND USE
Cornelius D. Dosker, Louisville, Ky., assignor, by mesne assignments, to Conch International Methane Limited, Nassau, Bahamas, a corporation of the Bahamas
Filed July 2, 1958, Ser. No. 746,148
14 Claims. (Cl. 20—4)

This invention relates to an insulation panel of modular construction, and it relates more particularly to such insulation panels and a space of large dimension lined with the same to provide an insulated space suitable for use in the storage and transportation of a liquid or other material which needs to be maintained at extremely low temperature, such as, for example, a liquefied gas.

In my copending application Serial No. 646,001, filed March 14, 1957, description is made of insulation panels of modular construction independently mounted in end-to-end and in side-by-side relation on supporting walls to provide an insulation lining defining an insulated space into which separate metal tanks are positioned for housing a cold liquid. The modular panels are constructed of a relatively thick intermediate layer of interbonded slabs of balsa wood faced on each side with sheets of hardwood plies. The panels, prefabricated into 8 x 8 or 4 x 8 feet sections can be independently mounted on the supporting walls by means of threaded studs inserted through openings in the panels and welded to the supporting walls, with portions of the studs extending through the openings into the panels for receiving fastening means. The mounted relationship is established by tightening the fastening means down against the outer ply to hold the outer ply in a stabilized position on the supporting wall. The openings are later plugged and the spaces between the panels are blocked with a suitable spline and expansion joints are provided to maintain a sealing relationship between the panels to provide a substantially continuous insulation.

The described construction of the insulation panels and the insulated space fabricated thereof provides the conditions desired for the buildup of an insulated space of substantial dimension. However, balsa and the like woods, which represent a major proportion of the panels described, are rather expensive materials that are available only in fairly limited quantities. Thus it is desirable to be able to make use of a low cost material which is more readily available in the production of such insulation panels, but without sacrificing insulation characteristics, dimensional stability, mass integrity and the structural strengths required of the modular panels.

The described construction is also quite suitable when used in combination with tanks mounted within the insulated space for the housing of the cold liquid. Such metal tanks, necessarily formed of aluminum, alloys of aluminum, copper or stainless steel are costly, especially when constructed to a rectangular or other polygonal shape in cross-section for the more efficient utilization of the relatively limited amount of space available. Rectangular tanks of the type described require internal bracing for equalization or distribution of forces, and the forces generated when the tanks filled with the liquid are subjected to varied movement in transportation. Thus it is desirable also to be able to eliminate the need for such separate metal tanks for housing the liquid within an insulated space.

Briefly described, it is an object of this invention to produce and to provide a method for producing insulation panels of modular construction formed of readily available and low cost materials, and it is a related object to make use of such panels in the construction of an insulated space wherein the cold liquid can be housed directly in contact with the insulation lining, thereby to maximize the space available for storage and to minimize the need for expensive metal tanks, but it is also an object of this invention to provide an improved insulated space of the type described wherein such metal tanks can be housed for the storage of the cold liquid.

These and other objects and advantages of this invention will hereinafter appear and for purposes of illustration, but not of limitation, embodiments of the invention are shown in the accompanying drawings, in which—

FIGURE 4 is a sectional elevational view of a panel of the type shown in FIGURE 3 with the edge portions cut away for the expansion connection;

FIGURE 5 is a sectional elevational view of adjacent panels of the type shown in FIGURE 4 in their mounted relation;

FIGURE 6 is a perspective view of the inner surface of a fragmentary portion at the corner of the assembled panels.

Figure 1:
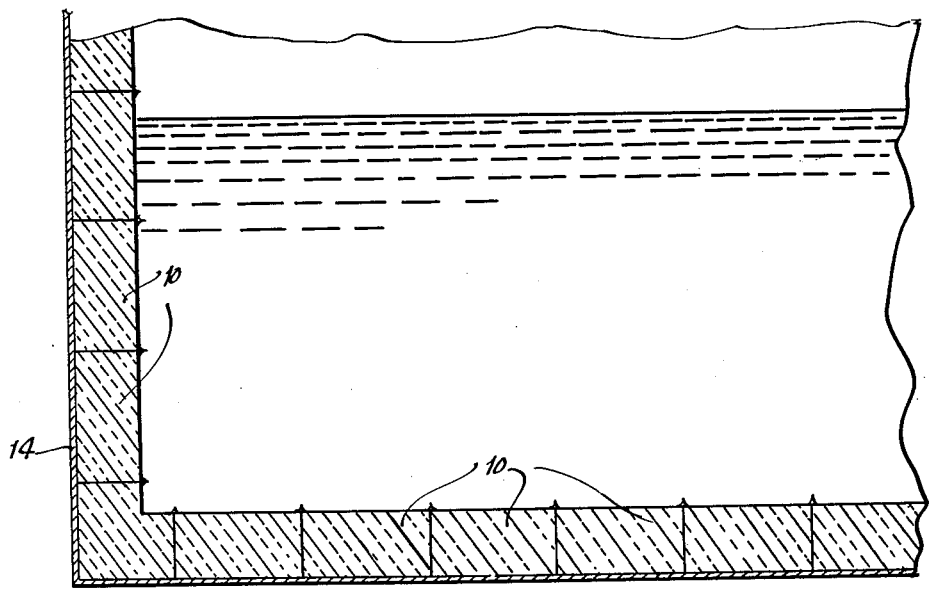
FIGURE 1 is a schematic sectional view of a fragmentary portion of an insulated space embodying the features of this invention.

The concepts of this invention reside in the combination which makes use of a cellular core 10 of paper honeycomb or corrugated veneer to provide a structurally strong and dimensionally stable insulation section of substantial thickness, such as a thickness ranging from 3–20 inches, depending upon the amount of insulation that is required. A sheet of hardwood laminate 12 of ¼ or more inches in thickness, is bonded to the outer face of the core 10 to protect the core and to provide a means for mounting the formed panel on the supporting wall 14.

The core need not be protected about the perimetric surfaces but it is preferred to line the perimetric surfaces as with a frame formed of wooden slabs 16, and more preferably with slabs of a structurally strong wood having good thermal insulating characteristics, such as balsa or the like wood, with the slabs alternating between end grain slabs and edge grain slabs. Where use is made of a lining of the type described, continuous grooves 18 can be formed in the perimetric surfaces adjacent the outer edge portion of the panel for registration with corresponding grooves in adjacent panels whereby a continuous opening is formed crosswise therebetween to enable a sealing strip 20 of a soft and resilient material, such as foamed polyurethane resins, to be fixed in bonded relationship therebetween. The sealing strip provides a barrier across the openings formed between adjacent panels and it functions further to block passage of convection current therebetween.

The honeycomb core can be of a unitary construction but it is preferable, from the standpoint of strength and efficiency in operation, to make use of a plurality of honeycomb sections 22 of lesser thickness which are bonded one to the other with barrier strips in the form of a membrane 24 extending continuously crosswise between the slabs with edge portions of the membrane preferably extending beyond the slabs and into the frame members to minimize vapor passage between and about the layers of honeycomb material. Extension of the membrane into sealing engagement with the frame also maintains the desired vapor and liquid barrier in the event of non-uniform contraction between the honeycomb section and the wooden or metallic elements. The number of sections 22 are selected to build up the desired thickness of the honeycomb core. The barrier strips 24 can be formed of a resinous treated paper to enhance the build-up of a strong bonding relationship between the core sections. Instead, the barrier can be formed of strips of wood or plywood treated with a resinous material to provide fluid imperviousness. By way of a still further modification, use can be made of barrier sheets in the form of metal foils, such as foils of aluminum or stainless steel, to provide spaced fluid and vapor-impervious walls extending continuously across the panel. Such metallic barriers will function also to reflect heat and cold thereby materially to improve the insulation characteristics.

Barrier sheets of metal foil are most desirable when the metal tanks are to be eliminated so that the cold liquid is housed in the insulated space directly in contact with the assembled lining. Each metal barrier sheet would function, in the arrangement described, to prevent the penetration of liquid through the insulation. When the openings in the honeycomb or corrugated insulated sections are of sufficiently small dimension, the combination of the porelike openings and the metal backing or barrier provides the desired resistance to vapor transmission to enable the buildup of back pressures within the pores, whereby the liquid is incapable of penetration to the metal barrier. This concept, referred to as the back pressure principle, is more fully described in the copending application of Morrison, Serial No. 692,388, filed October 25, 1957. It has been found that the liquid will be incapable of full penetration to the metal barrier when the pores directly in contact with the body of liquid are dimensioned to be less than about ¼ inch in cross-section. The pore dimension is not so limited when the liquid is not in direct contact wtih the core, as when use is made of a continuous metallic film on the inner face of the panels.

In accordance with the preferred practice of this invention, a continuous sheet 26 of a suitable vapor or fluid impervious material, as represented by metal, is adhesively bonded directly to the inner face of the core to extend continuously across the panel. The sheet can be formed of any metal which is capable of retaining its strength and ductility at the temperature of the liquid. For this purpose, it is preferred to make use of aluminum, alloys of aluminum, copper, stainless steel or other austenitic steels. Ordinary steels, such as used in tank construction and ship construction, lose their ductility at such low temperatures. The metal facing can be in the form of a metal foil of several mils' thickness or, more preferably, sheets having a thickness in the range of 20-150 mils.

A number of difficulties have heretofore been encountered in an assembly embodying the combination of metal plies and wood by reason of the large temperature changes occurring in the inner section of the panel under the conditions of use. When installed, the panel sections will be at ambient temperature of about 70–100° F. When subsequently filled with liquid, such as liquefied natural gas at about atmospheric pressure, the portions of the panel adjacent the liquid will be reduced in temperature to about −250° F. and a temperature gradient from −250° F. on the inside to ambient temperature on the outside will exist through the cross-section of the panel. Such temperature changes will occur periodically in response to the introduction or removal of the cold liquid.

The materials of which the panels are formed are subject to dimensional change responsive to expansions and contractions resulting from such changes in temperature. Most woods and paper have a coefficient of expansion and contraction differing materially from the coefficient of metal. Thus, where use is made of the combination of metal and wood, one cannot be joined to the other without raising substantial stresses between the materials. It has been found, however, that the metal facing can be adhesively secured in sealing relation directly to the honeycomb or corrugated veneer. This is because the honeycomb or veneer core is capable of such deformations as to comply with the greater expansions and contractions of the metal facing sheet. While not necessary, grooves 30 may be formed in the inner face of the core 10 adjacent the linear edges to enable a looped portion 32 to be formed in the metal facing sheet to be received within the grooves in unbonded relation to function as expansion members. Thus, any developed stresses between the materials can be dissipated by the expansion section, thereby to minimize the amount of stresses carried to the edge portions of the panels.

The metal facing sheet 26 is dimensioned to be greater in length and width than the corresponding dimensions of the panel so as to provide free edge portions 34 all around which can be turned inwardly to provide an angled portion 36 and a flanged end portion 38 adapted to abut the corresponding flanged portion of the metal facing sheets of adjacent panels to enable joinder by conventional metal joining means, such as brazing, welding, soldering or the like. The upstanding flange 38 is spaced from the panel surface by an amount to enable use of heat in the metal joining process without injuring the panels. The additional metal provided in the described loop between adjacent panels is capable of functioning as an expansion joint which permits a sealing relationship to be maintained between the panel sections while permitting relative movements between the panels in expansion and contraction. It will be understood that the free end portions of the panels may be formed to other desirable shapes, such as to curvilinear contours, to form a bulbous portion as the expansion joint, and the free ends of adjacent panels may be folded one into the other to insure a continuous and permanent sealing relationship therebetween.

Another method of fastening and sealing adjacent flanged edges 34 is to grip the adjacent formed edges between a preformed U-shaped strip (not shown) in which a sealant (not shown) has been applied. The adjacent faces of the U-shaped clip are then pressed together and the bonding sealant fused or cured. For this purpose, use can be made of a sealant in the form of a resinous material capable of being advanced to a cured stage, as represented by an epoxy type resinous material, or use can be made of a eutectic metal or other low melting point metal which can be reduced to the desired state of flow for sealing by such means as resistance heaters or the like.

Figure 3:
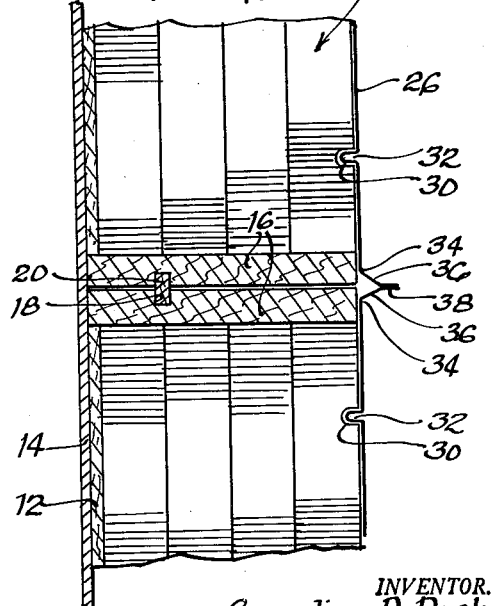
FIGURE 3 is a sectional elevational view of adjacent panels in their mounted relation with the panels in FIGURE 2 embodying a modification in the panel construction.

Instead of permitting the angled portion 36 to extend inwardly into the insulated space, as shown in FIGURE 3, the linear edges of the panels may be cut away or otherwise formed with recesses 40 to provide a contiguous opening 42 between adjacent panels in which the metal loop can be received. The flanges may be joined while the end portions extend inwardly away from the panels, after which the excess material can be displaced into the opening between the panels, as illustrated in FIGURE 5.

Figure 2:
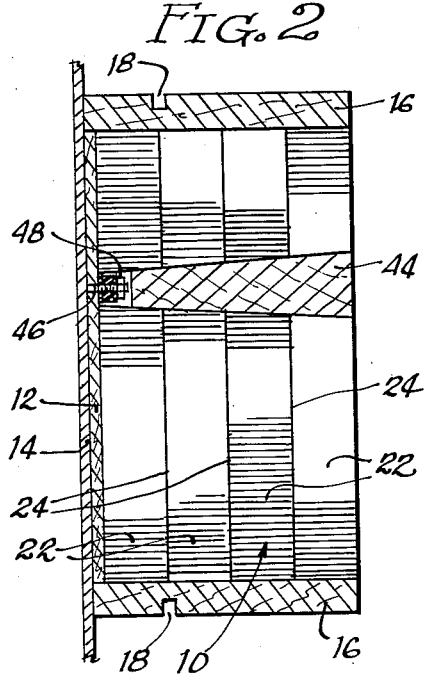
FIGURE 2 is a sectional elevational view through a modular panel fabricated in accordance with the practice of this invention.

In FIGURE 2 illustration is made of the means described in the aforementioned copending application for the assembly of the panels upon the supporting walls. For this purpose, conically shaped openings 44 are provided in spaced-apart relation through the core or preferably through the frame to the outer plywood facing 12, and an opening of smaller dimension continues through the plywood facing to the outside of the panel. A Nelson stud 46 is inserted through the opening and welded to the steel wall 14 with a threaded portion of the stud extending inwardly into the aligned openings. A washer and/or a resilient gasket may be inserted onto the through-extending portion of the stud, and a nut member 48 can thereafter be threaded onto the stud to bring the washer or gasket into resilient engagement with the inner face of the plywood panel 12 for holding the panel onto the supporting walls. When such means are employed, it is desirable to apply the metal facing sheet 26 to the inner wall of the panel after assembly has been effected and the openings plugged. When means are provided for assembly of the panels on the walls other than by access through openings in the panels, such as by the use of hangers or means operative through the supporting walls, the metal facing sheet 26 can be secured to the core during the prefabrication of the panels.

At the intersections between panels, the overhang of the metal facing sheets may be joined one to the other in the form of a cylindrical, pyramidal, conical, or other bulbous construction, or attachment may be made to a cylindrical metallic insert 50, as illustrated in FIGURE 6, with the free edges secured in sealing relationship one to the other or the cylindrical member to provide a joinder therebetween capable of deformations in multiple directions in response to the forces existing upon expansion and contraction of the panels.

It will be evident that the foregoing construction provides a continuous metal lining backed substantially throughout its entire area with a structurally strong and dimensionally stable insulation to enable the lining to function as the primary container for the housing of a cold liquid. Thus the expensive tanks can be eliminated and more efficient use can be made of the storage space available. If desired, the metal tanks can be employed whereby the described insulation lining will function desirably as a second line of defense against the penetration of liquid to the supporting steel walls.

In the event that the bonding relationship capable of being developed between the metallic facing sheet 26 and the honeycomb or corrugated core is insufficient, a barrier sheet of wood or paper, with or without a resinous treatment, may be employed as an interbonding agent between the metal and core. As the adhesives, use can be made of the polyesters, polyisocyanates, rubber base adhesives, and other adhesives normally used in bonding metal to wood.

Instead of the means described for providing an expansion joint between the panels, use can be made of separate expansion members of the type described in the application of Walter W. Beam, Serial No. 744,605, filed on June 25, 1958, and entitled "Insulated Space and Elements Thereof." As described in the said application, use is made of elongate metal members in the form of strips having a bulbous portion which extends continuously through about the center of the strip. The edges of the metal expansion member are secured by conventional joining means to the adjacent edge portions of the metal facing sheets on adjacent panels with the bulbous portions positioned in alignment with the meeting edges of the panels or in an opening formed therebetween. When such means are employed, it is unnecessary to make use of a metal facing sheet having edge portions extending beyond the panel but such means can be provided to enable joinder of the metal members in spaced relation with the insulation or core.

The fluid and vapor impervious facing sheet can also be fabricated of a thin or thick continuous membrane of a synthetic resinous or elastomeric material, such as polyethylene, polytetrafluoroethylene, other halogenated ethylene derivative polymers or resinous polymers which are capable of retaining their ductility and flexibility at low temperatures of the liquid and which are fluid impervious.

It will be apparent from the foregoing that I have provided a new and novel insulation in the form of panels capable of prefabrication on a mass production basis, and assembly in a simple and efficient manner to form a continuous insulation lining to define an insulated space of substantial dimension which can function as a primary container or a secondary container for a liquid content material which has to be maintained at extremely low temperature.

It will be understood that changes may be made in the specific materials and the details of construction and operation from the standpoint of the panels and their assembly to form the insulated space, without departing from the spirit of the invention, especially as defined in the following claims.

I claim:

1. In an insulated space of large dimension for the storage of a material which needs to be maintained at a temperature differing considerably from the ambient temperature, a supporting wall defining the space to be insulated, a plurality of prefabricated insulation panels formed of a honeycomb core and a metal facing adhesively bonded to extend continuously across one face of the core, means mounting the insulation panel in end-to-end and in side-by-side relation on the supporting walls with the metal facing away from the wall, means interconnecting the metal face sheets in sealing relationship one with the other in adjacent panels with a bulbous portion in between to enable relative movements between the panel sections in expansion and contraction without disturbing the sealing relationship, and in which the metal face sheet is dimensioned to be greater in length and width than the corresponding dimensions of the panel to provide free edge portions extending beyond the linear edges of the panel and in which the free edge portions of the metallic strips in adjacent panels are joined one to another to provide a bulbous portion therebetween as the means interconnecting the panels in sealing relation.

2. An insulated space as claimed in claim 1 in which the pores of the core are dimensioned to be less than ¼ of an inch in cross-section.

3. An insulated space as claimed in claim 1 in which the honeycomb core comprises a plurality of honeycomb slabs having a thickness less than the thickness of the core and which combine to make up the thickness of the core and which include barrier sheets extending continuously between the adjacent slabs and adhesively interbonded therewith.

4. An insulation panel as claimed in claim 3 in which the barrier sheet comprises a metal sheet.

5. An insulated space as claimed in claim 1 in which the metal face sheet is formed of a metal which retains its ductility at low temperature.

6. An insulated space as claimed in claim 5 in which the metal face sheet is formed of metal selected from the group consisting of aluminum, alloy of aluminum, copper, stainless steel, and austenitic steels.

7. An insulated space as claimed in claim 1 in which the core is formed with a recess about the inner face in closely spaced relation with the edges and in which the metal face sheet is embossed in portions to be received within the recess as a stress-relieving and expansion section.

8. An insulated space as claimed in claim 1 in which the metal face sheet is dimensioned to have a length and width greater than the corresponding dimensions of the panel to provide free edge portions all around.

9. An insulated space as claimed in claim 1 in which the linear edges of the panel underlying the metal face sheets are recessed to provide an opening between the adjacent panels in which the bulbous portion is received in an unbonded relation.

10. An insulated space as claimed in claim 1 in which a continuous sheet of fibrous material adhesively interbonds the metal face sheet to the honeycomb core.

11. An insulated space as claimed in claim 1 in which the free edge portions of the metal facing sheets at the intersections of the panels are joined one to the other at the corner section to provide a bulbous portion therebetween capable of maintaining the sealing relationship therebetween responsive to the varied movements of the panels making up the corner portions in expansion and contraction.

12. An insulated space as claimed in claim 1 in which the means for joining the free edge portions of the metallic strips comprises elongate U-shaped cap members positioned to receive the free edge portions of the adjacent metal facing sheets therein, and means for effecting a sealing relationship of the free edges within the cap.

13. An insulated space as claimed in claim 1 in which each panel is formed with an outer lamina of a structurally strong material.

14. An insulation panel as claimed in claim 1 in which the perimetric surfaces of the core are enclosed within adhesively bonded walls of wooden panels.

References Cited in the file of this patent

UNITED STATES PATENTS

| | | |
|---|---|---|
| 984,541 | Coleman | Feb. 21, 1911 |
| 1,554,179 | Trader | Sept. 15, 1925 |
| 1,615,801 | Elmendorf | Jan. 25, 1927 |
| 1,644,199 | Moore | Oct. 4, 1927 |
| 2,091,061 | Waugh | Aug. 24, 1937 |
| 2,100,238 | Burgess | Nov. 23, 1937 |
| 2,125,286 | Fletcher | Aug. 2, 1938 |
| 2,238,022 | Johnson | Apr. 8, 1941 |
| 2,299,908 | Leash | Oct. 27, 1942 |
| 2,307,787 | Morrell | Jan. 12, 1943 |
| 2,662,043 | Clements | Dec. 8, 1953 |
| 2,797,448 | Revell | July 2, 1957 |
| 2,834,064 | Clements | May 13, 1958 |
| 2,855,636 | Donnelly | Oct. 14, 1958 |
| 2,889,953 | Morrison | June 9, 1959 |